(12) United States Patent  
Chung et al.

(10) Patent No.: US 12,546,698 B2  
(45) Date of Patent: Feb. 10, 2026

(54) FINE PARTICLE COUNTING METHOD USING MULTI-CHANNEL SAMPLE CHIP AND FINE PARTICLE COUNTING APPARATUS IMPLEMENTING SAME

(71) Applicant: NANOENTEK, INC., Seoul (KR)

(72) Inventors: Chan Il Chung, Seoul (KR); Hyoung Seop Lee, Gyeonggi-do (KR); Sanghwa Ahn, Gyeonggi-do (KR)

(73) Assignee: NANOENTEK, INC., Seoul (KR)

( * ) Notice: Subject to any disclaimer, the term of this patent is extended or adjusted under 35 U.S.C. 154(b) by 253 days.

(21) Appl. No.: 18/270,795

(22) PCT Filed: Jan. 25, 2022

(86) PCT No.: PCT/KR2022/001294  
§ 371 (c)(1),  
(2) Date: Jul. 3, 2023

(87) PCT Pub. No.: WO2022/158940  
PCT Pub. Date: Jul. 28, 2022

(65) Prior Publication Data  
US 2024/0295487 A1 Sep. 5, 2024

(30) Foreign Application Priority Data  
Jan. 25, 2021 (KR) ........................ 10-2021-0010369

(51) Int. Cl.  
*G01N 15/1433* (2024.01)  
*G01N 15/01* (2024.01)  
*G01N 15/14* (2024.01)

(52) U.S. Cl.  
CPC ..... *G01N 15/1433* (2024.01); *G01N 15/1456* (2013.01); *G01N 15/01* (2024.01); *G01N 2015/1486* (2013.01)

(58) Field of Classification Search  
CPC ........... G01N 15/1433; G01N 15/1456; G01N 15/01; G01N 15/1484; G01N 15/1434;  
(Continued)

(56) References Cited

U.S. PATENT DOCUMENTS 9,518,914 B2    12/2016  Gurkan et al.  
2006/0187442 A1  8/2006  Chang et al.  
(Continued)

FOREIGN PATENT DOCUMENTS

CN   107003233 A   8/2017  
JP   2012-504949 A  3/2012  
(Continued)

OTHER PUBLICATIONS

Office action issued on Apr. 8, 2024 from Japan Intellectual Property Office in a counterpart Japanese Patent Application No. 2023-539939 (all the cited references are listed in this IDS.) (English translation is also submitted herewith.).

(Continued)

*Primary Examiner* — Sang H Nguyen  
(74) *Attorney, Agent, or Firm* — The PL Law Group, PLLC

(57) ABSTRACT

In a fine particle counting method using a multi-channel sample chip and a fine particle counting apparatus implementing the method, a plurality of samples is observable in a short period of time and even when warpage occurs during a manufacturing process as a sample chip becomes larger, the warpage is corrected so as to count fine particles accurately. Problems that a focal distance of each channel is not constant due to warpage occurring in a chip having a plurality of channels, and thus it takes a lot of time to obtain an image by obtaining a focus value for each channel may be solved. A problem that since an amount of sample injected into each channel is small, a sample dries out when (Continued)

an image is not quickly obtained and used for counting, thereby causing the occurrence of measurement error may be prevented.

12 Claims, 16 Drawing Sheets

(58) Field of Classification Search
CPC .............. G01N 15/06; G01N 15/0227; G01N 2015/1486; G01N 2015/1006; G01N 2015/1452; G01N 21/8483; G01N 33/49; G01N 2030/8822
See application file for complete search history.

(56) References Cited

U.S. PATENT DOCUMENTS

| | | | |
|---|---|---|---|
| 2009/0116005 A1* | 5/2009 | Furuki | G01N 21/6428 356/246 |
| 2011/0306041 A1 | 12/2011 | Viovy et al. | |
| 2014/0193892 A1 | 7/2014 | Mohan et al. | |
| 2015/0101422 A1* | 4/2015 | Hur | G01N 33/48 73/864.81 |
| 2015/0198536 A1* | 7/2015 | Naya | G01N 21/6402 356/244 |
| 2016/0291306 A1* | 10/2016 | Fukuda | G02B 21/244 |
| 2018/0149855 A1 | 5/2018 | Chou et al. | |
| 2020/0003672 A1* | 1/2020 | Okumura | H01T 19/04 |

FOREIGN PATENT DOCUMENTS

| | | |
|---|---|---|
| JP | 2013-257282 A | 12/2013 |
| JP | 2016-194438 A | 11/2016 |
| JP | 2018-173943 A | 11/2018 |
| KR | 10-2005-0010709 A | 1/2005 |
| KR | 10-0608498 B1 | 8/2006 |
| KR | 10-1829551 B1 | 2/2018 |
| KR | 10-2130960 B1 | 7/2020 |
| WO | WO 2016/161022 A2 | 10/2016 |
| WO | WO 2020/150652 A1 | 7/2020 |

OTHER PUBLICATIONS

Office action issued on Sep. 11, 2023 from Korean Patent Office in a counterpart Korean Patent Application No. 10-2022-0010747 (all the cited references are listed in this IDS.) (English translation is also submitted herewith.).

International Search Report for PCT/KR2022/001294 mailed on May 16, 2022.

European Search Report for EP22742916.4 issued on Oct. 25, 2024 from European patent office in a counterpart European patent application.

* cited by examiner

FIG. 3
☐ Focusing mark (in circular shape or grid shape)
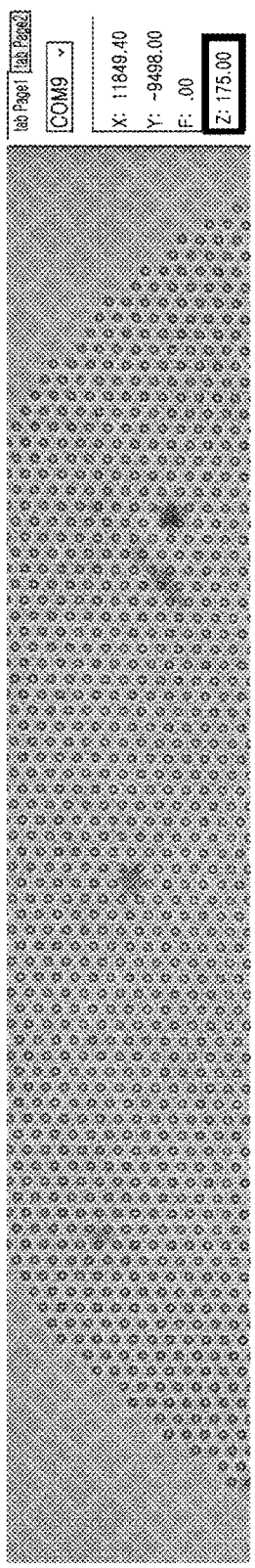
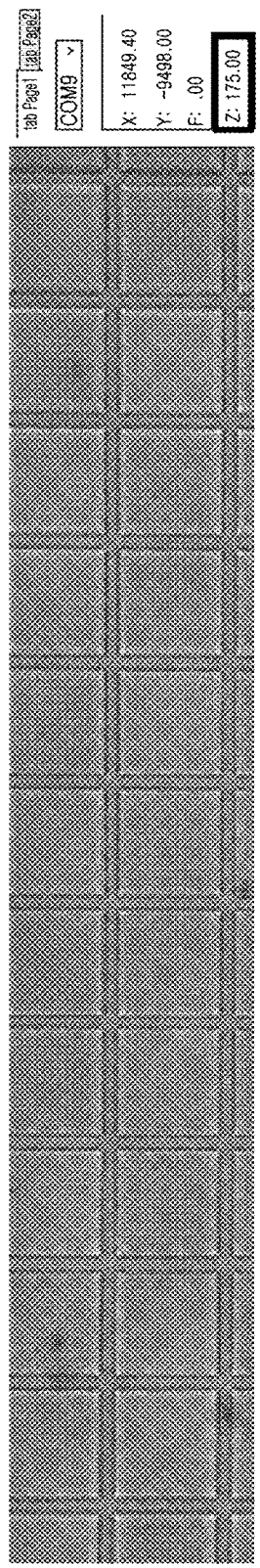
☐ observation area of adjacent channel
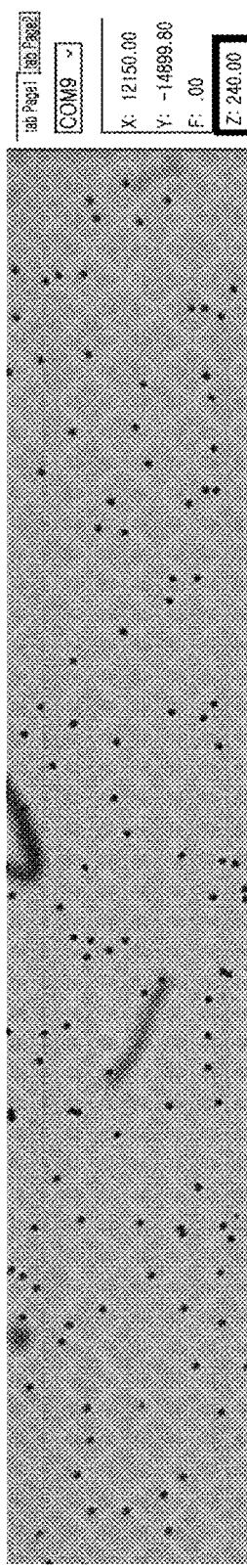

FIG. 4

□ F01 channel of sample chip

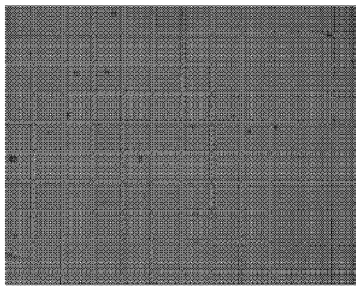 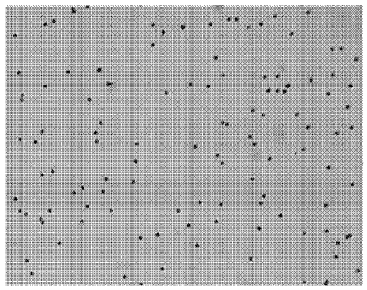 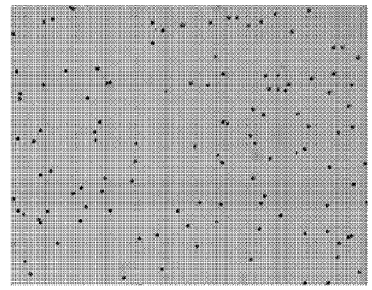

focus value of grid focusing mark: 260 μm focus value of channel to which warpage correction value is applied: 325μm focus value of channel captured by auto focus : 315μm

FIG. 5

□ F08 channel of sample chip

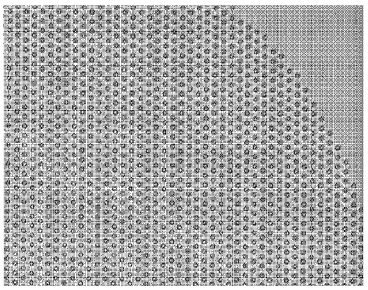 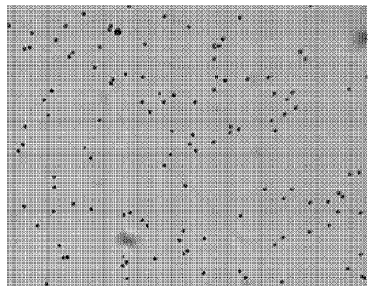 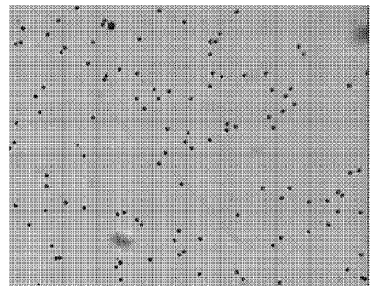

focus value of circular focusing mark: 260μm focus value of channel to which warpage correction value is applied: 325μm focus value of channel captured by auto focus: 315μm

FIG. 19

< Focus values of focusing marks corresponding to respective channel positions>

| position (distance difference μm) | A (0) | B (20000) | C (40000) | D (60000) | E (80000) | F (100000) |
|---|---|---|---|---|---|---|
| 01 (0) | 1000 | 1200 | 1400 | 1600 | 1800 | 2000 |
| 02 (18000) | 1143 | 1343 | 1543 | 1743 | 1943 | 2143 |
| 03 (36000) | 1286 | 1486 | 1686 | 1886 | 2086 | 2286 |
| 04 (54000) | 1429 | 1629 | 1829 | 2029 | 2229 | 2429 |
| 05 (72000) | 1572 | 1772 | 1972 | 2172 | 2372 | 2572 |
| 06 (90000) | 1715 | 1915 | 2115 | 2315 | 2515 | 2715 |
| 07 (108000) | 1858 | 2058 | 2258 | 2458 | 2658 | 2858 |
| 08 (126000) | 2000 | 2200 | 2400 | 2600 | 2800 | 3000 |

FINE PARTICLE COUNTING METHOD USING MULTI-CHANNEL SAMPLE CHIP AND FINE PARTICLE COUNTING APPARATUS IMPLEMENTING SAME

CROSS REFERENCE TO RELATED APPLICATIONS AND CLAIM OF PRIORITY

This application claims benefit under 35 U.S.C. 119, 120, 121, or 365(c), and is a National Stage entry from International Application No. PCT/KR2022/001294, filed Jan. 25, 2022, which claims priority to the benefit of Korean Patent Application No. 10-2021-0010369 filed on Jan. 25, 2021, in the Korean Intellectual Property Office, the entire contents of which are incorporated herein by reference.

BACKGROUND

1. Technical Field

The present disclosure relates to a fine particle counting method using a multi-channel sample chip and a fine particle counting apparatus implementing the same and, more particularly, to a fine particle counting method using a multi-channel sample chip and a fine particle counting apparatus implementing the same, wherein a plurality of samples is observable in a short period of time and even when warpage occurs during a manufacturing process as a sample chip becomes larger, the warpage is corrected so as to count fine particles accurately.

2. Background Art

For patients with diseases such as AIDS, leukemia, anemia, or the like, it is required to count the number of white blood cells or red blood cells, which are related to the diseases, in the blood of these patients and to understand the distribution of the blood cells in order to diagnose these diseases, monitor their progress or developments, and determine the effectiveness of treatment.

In particular, not only blood tests for diagnosing the above diseases, but also blood tests for monitoring patients who are diagnosed to have the above diseases are becoming more common.

In the past, clinical pathologists in most hospitals manually counted white blood cells or red blood cells in blood. Since the clinical pathologists manually counted the blood cells, many errors occurred in test results and it took a lot of time to test the blood.

In order to solve these problems, the present applicant has developed a fine particle counting apparatus capable of automatically and quickly counting fine particles such as cells, and has applied for and registered the apparatus as Korea Patent No. 10-0608498.

Recently, the application of such a fine particle counting apparatus is not limited to diagnosing or treating human diseases, but is variously expanding its application fields such as testing of raw milk from cows. Accordingly, the need for an apparatus capable of quickly and accurately testing and counting large-volume and multi-species samples is increasing.

Meanwhile, in a case of a sample chip having multiple channels manufactured to observe a plurality of samples within a short period of time, the size of the sample chip is increasing, and accordingly, during a manufacturing process, the sample chip is not made flat as a whole and warpage thereof occurs.

As described above, there are problems in that the height of each channel is not constant due to the warpage occurring in the chip having the plurality of channels, and it takes a lot of time to obtain an image by obtaining a focus value for each channel.

In addition, there is a problem in that since an amount of sample injected into each channel is as small as 10 µl, a sample dries out when an image is not quickly obtained and used for counting, thereby causing the occurrence of measurement error.

Accordingly, there is the need for solving the problems and realizing a fine particle counting method using a multi-channel sample chip and a fine particle counting apparatus implementing the same, wherein a plurality of samples is observable in a short period of time and even when warpage occurs during a manufacturing process as a sample chip becomes larger, the warpage is corrected so as to count fine particles accurately.

SUMMARY

An objective of the exemplary embodiments of the present disclosure is to achieve that a plurality of samples is observable in a short period of time and even when warpage occurs during a manufacturing process as a sample chip becomes larger, the warpage is corrected so as to count fine particles accurately.

In addition, another objective of the present disclosure is to solve the problems that a focal distance of each channel is not constant due to warpage occurring in a chip having a plurality of channels, and thus it takes a lot of time to obtain an image by obtaining a focus value for each channel.

In addition, a yet another objective of the present disclosure is to prevent a problem that since an amount of sample injected into each channel is small, a sample dries out when an image is not quickly obtained and used for counting, thereby causing the occurrence of measurement error.

According to one aspect of the present disclosure, there is provided a fine particle counting method using a multi-channel sample chip, the method counting fine particles in a sample accommodated in each channel on the sample chip having a plurality of channels and a plurality of focusing marks, and the method including: obtaining a warpage correction value by calculating a difference between a focus value of a specific focusing mark among the plurality of focusing marks and a focus value of a channel adjacent to the specific focusing mark; measuring respective focus values of the plurality of focusing marks; obtaining an image through a focus value obtained by applying the warpage correction value to a focus value of an adjacent focusing mark while sequentially moving between each channel; and counting the fine particles in the sample accommodated in each channel through the obtained image.

The number of focusing marks may be less than the number of channels.

Each focusing mark may be formed by clustering a plurality of protrusion shapes.

Each focusing mark may be formed in a grid shape.

A distance per unit pixel may be obtained by using a grid pattern of each focusing mark in the grid shape, and an area may be obtained by applying this distance per unit pixel to image resolution and applied as the area of the image of the adjacent channel.

In the obtaining of the warpage correction value, the focus value for the specific focusing mark may be obtained through auto focus control, and the focus value of the channel adjacent to the specific focusing mark may be obtained through manual focus control or the auto focus control.

In the measuring of the respective focus values of the plurality of focusing marks, the focus values may be obtained through auto focus control.

According to another aspect of the present disclosure, there is provided a fine particle counting apparatus using a multi-channel sample chip, the apparatus including: a sample chip provided with a plurality of channels each accommodating a sample containing fine particles; a stage provided with the sample chip seated thereon; a light source unit configured to emit light to each channel on the sample chip seated on the stage; an objective lens unit configured to magnify an image of the sample accommodated in each channel through which the light passes; an image sensor unit configured to obtain the image magnified by the objective lens unit; a fine particle counting unit configured to count the fine particles in the sample accommodated in each channel through the obtained image; and a stage movement unit configured to move the stage, wherein the sample chip may further include a plurality of focusing marks for obtaining focusing information for correcting a warpage height deviation of each channel.

The correcting of the warpage height deviation of each channel may be performed by applying, to the focus value of each focusing mark, the warpage correction value obtained by calculating a difference between a focus value for a specific focusing mark among the plurality of focusing marks and a focus value of a channel adjacent to the specific focusing mark.

The number of focusing marks may be less than the number of channels.

Each focusing mark may be formed by clustering a plurality of protrusion shapes.

Each focusing mark may be formed in a grid shape.

According to a yet another aspect of the present disclosure, there is provided a fine particle counting method using a multi-channel sample chip, the method counting fine particles in a sample accommodated in each channel on a sample chip having a plurality of channels and a plurality of focusing marks, and the method including: measuring respective focus values of the plurality of focusing marks; obtaining a warpage correction value by calculating a difference between a focus value of a specific focusing mark among the plurality of focusing marks and a focus value of a channel adjacent to the specific focusing mark; obtaining an image through a focus value obtained by applying the warpage correction value to a focus value of an adjacent focusing mark while sequentially moving between each channel; and counting the fine particles in the sample accommodated in each channel through the obtained image.

In the respective focus values of the plurality of focusing marks, focus values of some focusing marks among all the focusing marks may be measured, and by using this, topology mapping may be performed on a degree of warpage of an entire sample chip to obtain focus values of remaining focusing marks.

Each focusing mark in the grid shape may be formed by embossing.

Steps of obtaining the warpage correction value, measuring the respective focus values for the plurality of focusing marks, and obtaining the image may be repeatedly performed for each group formed by dividing the sample chip.

The groups applying a same warpage correction value may be designated in advance.

The exemplary embodiments of the present disclosure have an effect allowing a plurality of samples to be observable in a short period of time and even when warpage occurs during a manufacturing process as a sample chip becomes larger, the warpage is corrected so as to count fine particles accurately.

In addition, the present disclosure has another effect capable of solving the problems that a focal distance of each channel is not constant due to warpage occurring in a chip having a plurality of channels, and thus it takes a lot of time to obtain an image by obtaining a focus value for each channel.

In addition, the present disclosure has a yet another effect capable of preventing a problem that since an amount of sample injected into each channel is small, a sample dries out when an image is not quickly obtained and used for counting, thereby causing the occurrence of measurement error.

BRIEF DESCRIPTION OF THE DRAWINGS

FIG. 3 is a view of images illustrating an example in which a warpage correction value is obtained through a difference between a focus value of a specific focusing mark and a focus value of a channel adjacent to the specific focusing mark in the sample chip of the fine particle counting apparatus using the multi-channel sample chip according to the exemplary embodiment of the present disclosure.

FIG. 4 is a view of comparison images illustrated by comparing an image captured through auto focus control and an image captured with a focus value obtained by applying a warpage correction value to a focus value of an adjacent focusing mark when observing a F01 channel of the sample chip of the fine particle counting apparatus using the multi-channel sample chip according to the exemplary embodiment of the present disclosure.

FIG. 5 is a view of comparison images illustrated by comparing an image captured through auto focus control and an image captured with a focus value obtained by applying a warpage correction value to a focus value of an adjacent focusing mark when observing a F08 channel of the sample chip of the fine particle counting apparatus using the multi-channel sample chip according to the exemplary embodiment of the present disclosure.

FIG. 19 is a table illustrating an example of obtaining a focus value of a focusing mark corresponding to a position of each channel through the topology mapping in the sample chip of the fine particle counting apparatus using the multi-channel sample chip according to the exemplary embodiment of the present disclosure.

DETAILED DESCRIPTION

Hereinafter, preferred exemplary embodiments of the present disclosure will be described in detail with reference to the accompanying drawings. However, the present disclosure is not limited to the exemplary embodiments described herein and may be embodied in other forms. Rather, the exemplary embodiments introduced herein are provided so that the disclosed subject matter may be thorough and complete, and that the spirit of the present disclosure may be sufficiently conveyed to those skilled in the art. The same reference numbers throughout the specification indicate the same components.

Figure 1:
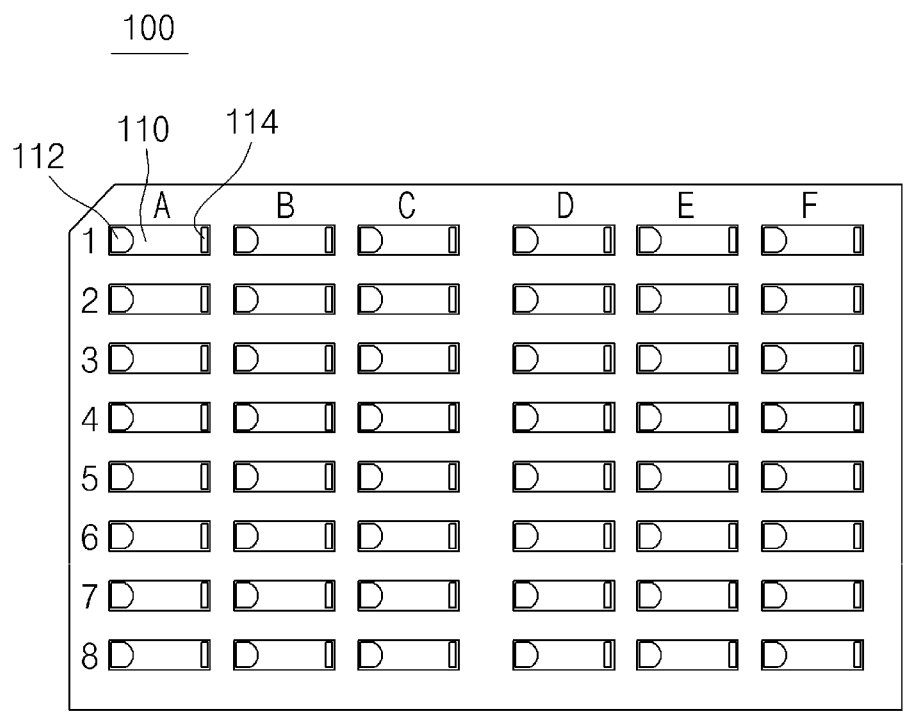
FIG. 1 is a plan view illustrating a sample chip of a fine particle counting apparatus using a multi-channel sample chip according to an exemplary embodiment of the present disclosure.
Figure 2:
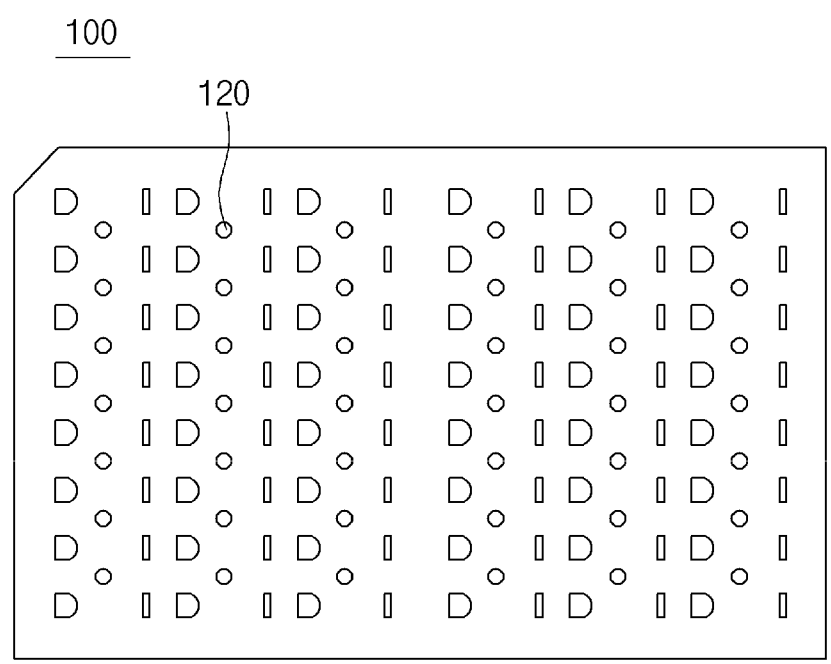
FIG. 2 is a plan configuration view illustrating an example in which focusing marks are provided in the sample chip of the fine particle counting apparatus using the multi-channel sample chip according to the exemplary embodiment of the present disclosure.
Figure 6:
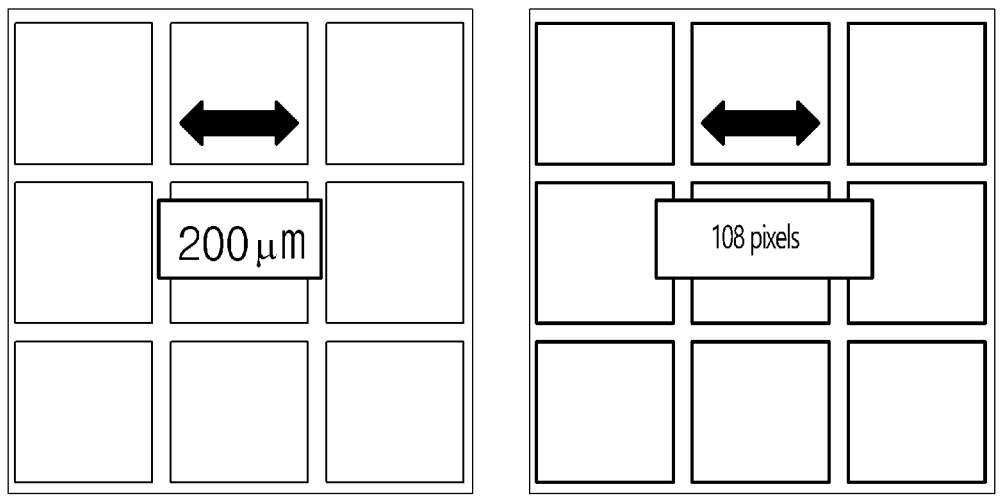
FIG. 6 is a configuration image illustrating an example of obtaining an image of a predetermined area of a grid chip having a grid pattern at intervals of 200 µm, calculating a value of µm per pixel by obtaining an average distance in units of pixels, and then applying the value of µm per pixel to the total image resolution to obtain an area.
Figure 7:
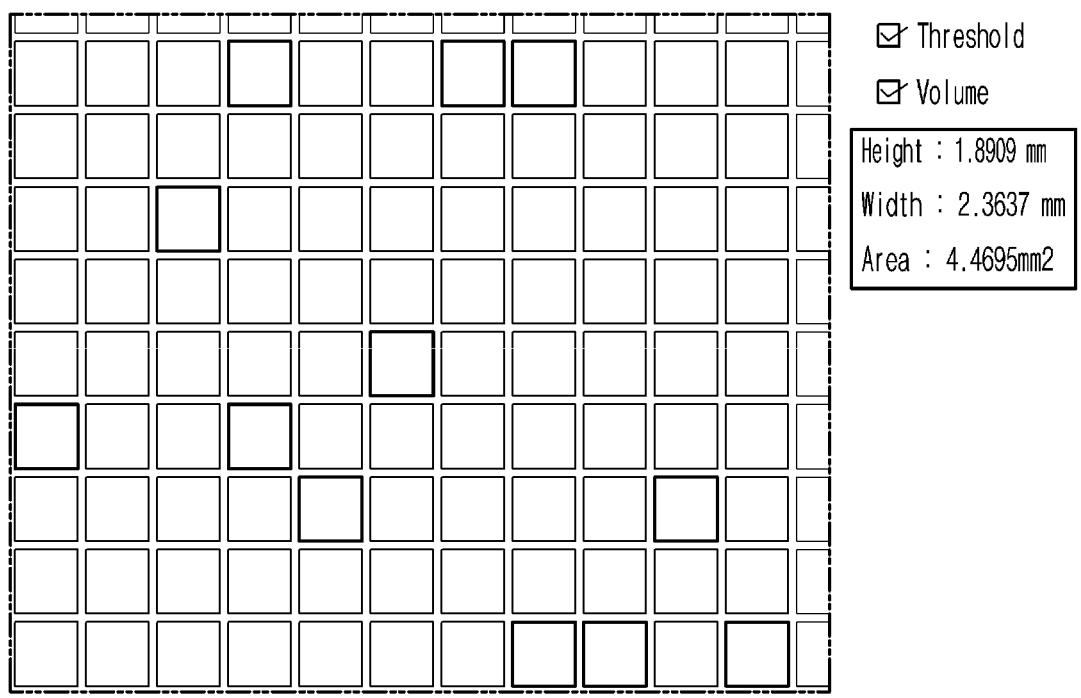
FIG. 7 is an image illustrating an example of obtaining an area according to image resolution by using a focusing mark adjacent to an A01 channel by applying an area obtainment method described in FIG. 6.
Figure 8:
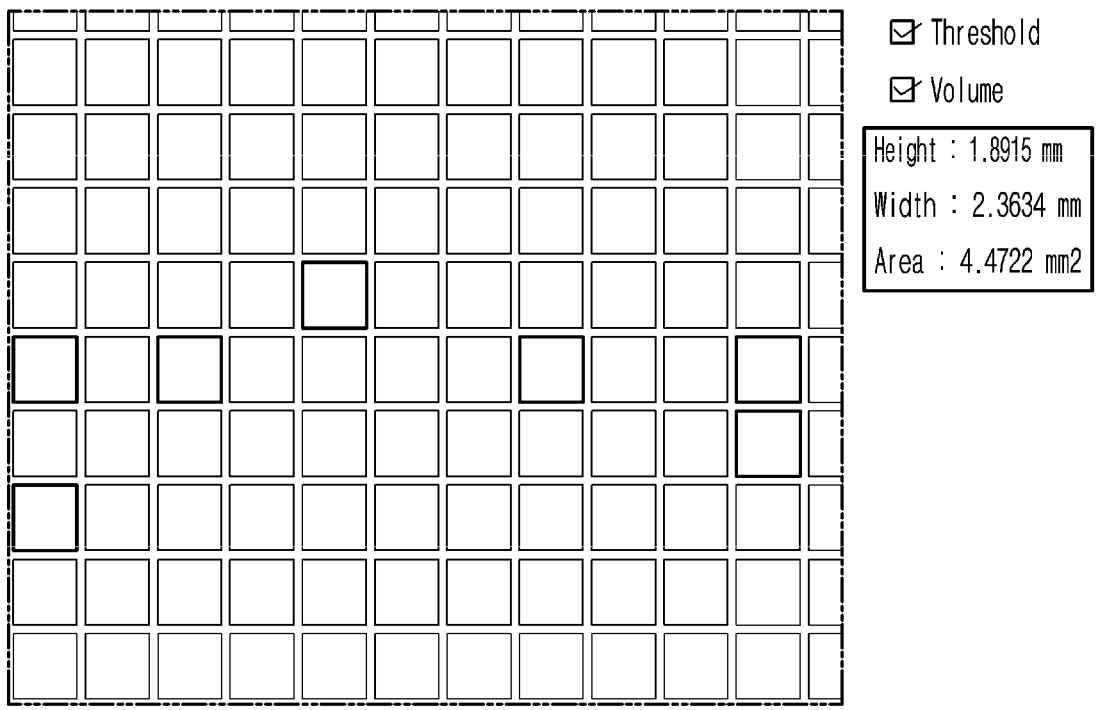
FIG. 8 is an image illustrating an example of obtaining an area according to the image resolution by using a focusing mark adjacent to a F01 channel by applying the area obtainment method described in FIG. 6.
Figure 9:
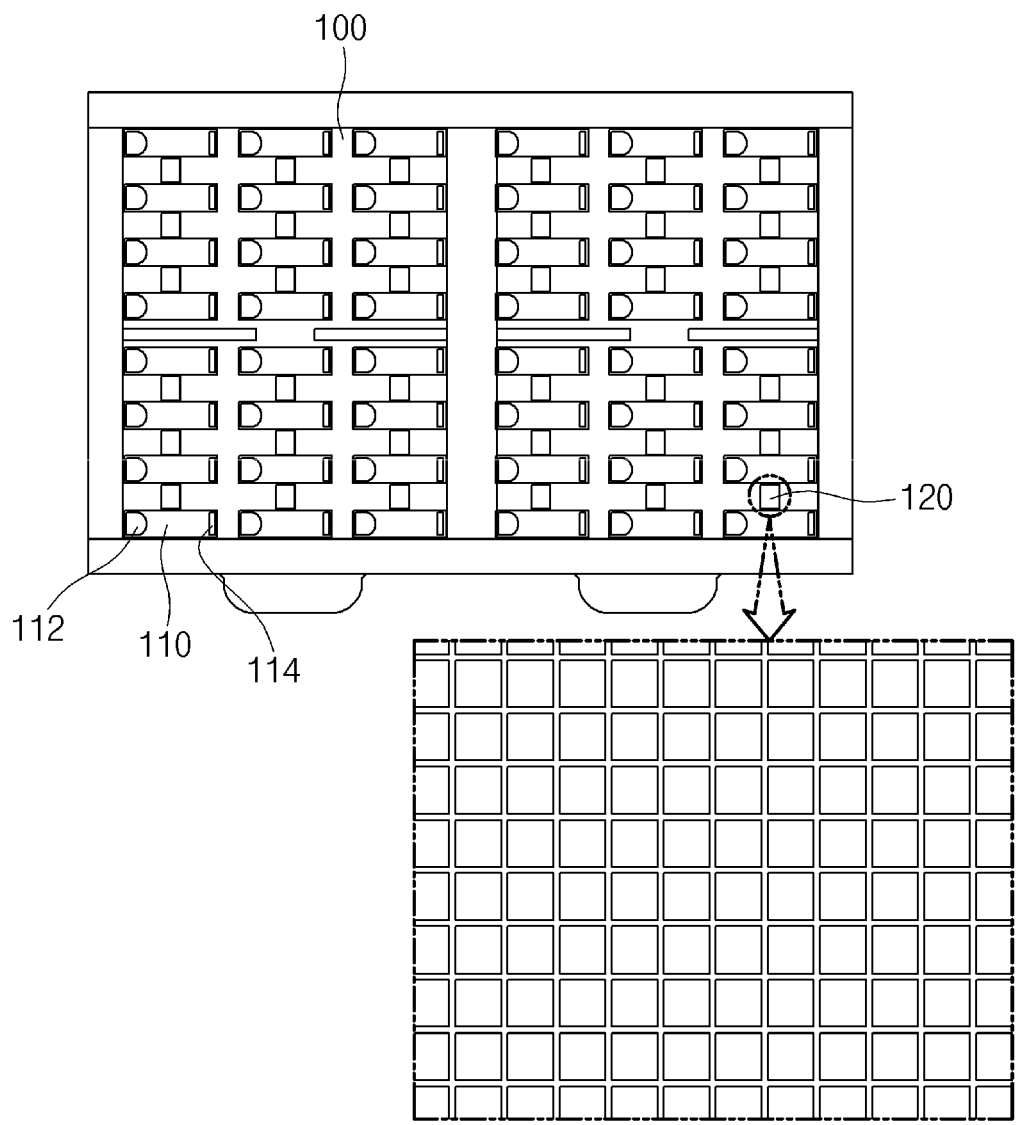
FIG. 9 is a plan configuration view illustrating an example in which each focusing mark of the sample chip of the fine particle counting apparatus using the multi-channel sample chip according to the exemplary embodiment of the present disclosure is formed as a grid.
Figure 10:
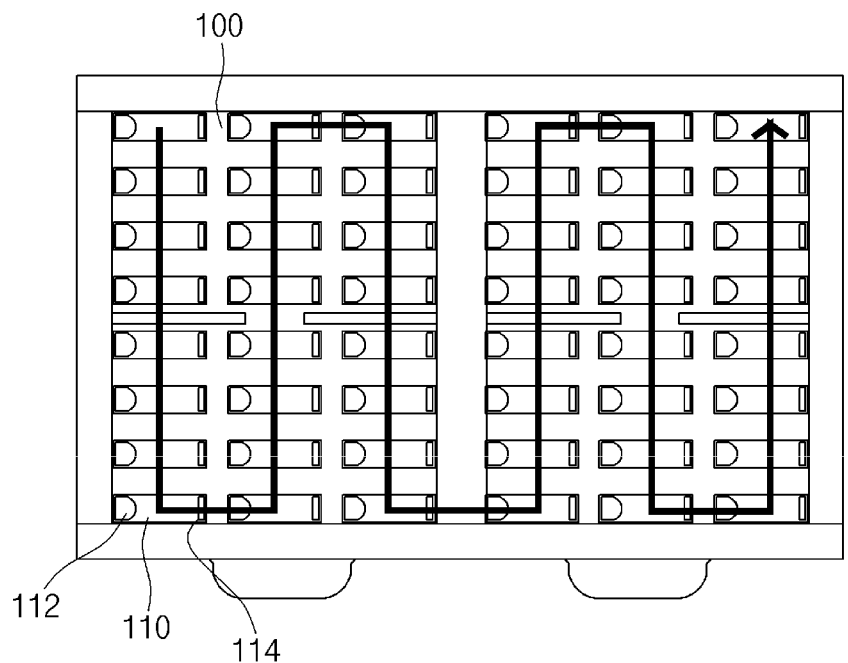
FIG. 10 is a plan configuration view illustrating an example of a sequence for obtaining a channel image of the multi-channel sample chip of the fine particle counting apparatus using the multi-channel sample chip according to the exemplary embodiment of the present disclosure.

FIG. 1 is a plan view illustrating a sample chip of a fine particle counting apparatus using a multi-channel sample chip according to an exemplary embodiment of the present disclosure. FIG. 2 is a plan configuration view illustrating an example in which focusing marks are provided in the sample chip of the fine particle counting apparatus using the multi-channel sample chip according to the exemplary embodiment of the present disclosure. FIG. 3 is a view of images illustrating an example in which a warpage correction value is obtained through a difference between a focus value of a specific focusing mark and a focus value of a channel adjacent to the specific focusing mark in the sample chip of the fine particle counting apparatus using the multi-channel sample chip according to the exemplary embodiment of the present disclosure. FIG. 4 is a view of comparison images illustrated by comparing an image captured through auto focus control and an image captured with a focus value obtained by applying a warpage correction value to a focus value of an adjacent focusing mark when observing a F01 channel of the sample chip of the fine particle counting apparatus using the multi-channel sample chip according to the exemplary embodiment of the present disclosure. FIG. 5 is a view of comparison images illustrated by comparing an image captured through auto focus control and an image captured with a focus value obtained by applying a warpage correction value to a focus value of an adjacent focusing mark when observing a F08 channel of the sample chip of the fine particle counting apparatus using the multi-channel sample chip according to the exemplary embodiment of the present disclosure. FIG. 6 is a configuration image illustrating an example of obtaining an image of a predetermined area of a grid chip having a grid pattern at intervals of 200 μm, calculating a value of μm per pixel by obtaining an average distance in units of pixels, and then applying the value of μm per pixel to the total image resolution to obtain an area. FIG. 7 is an image illustrating an example of obtaining an area according to image resolution by using a focusing mark adjacent to an A01 channel by applying an area obtainment method described in FIG. 6. FIG. 8 is an image illustrating an example of obtaining an area according to the image resolution by using a focusing mark adjacent to a F01 channel by applying the area obtainment method described in FIG. 6. FIG. 9 is a plan configuration view illustrating an example in which each focusing mark of the sample chip of the fine particle counting apparatus using the multi-channel sample chip according to the exemplary embodiment of the present disclosure is formed as a grid. FIG. 10 is a plan configuration view illustrating an example of a sequence for obtaining a channel image of the multi-channel sample chip of the fine particle counting apparatus using the multi-channel sample chip according to the exemplary embodiment of the present disclosure.

Referring to FIGS. 1 to 10, in a method for counting fine particles in a sample accommodated in each channel 110 on a sample chip 100 provided with a plurality of channels 110 and a plurality of focusing marks 120, the fine particle counting method using the multi-channel sample chip according to the exemplary embodiment of the present disclosure may largely be configured to include: obtaining a warpage correction value by calculating a difference between a focus value of a specific focusing mark 120 among the plurality of focusing marks 120 and a focus value of each channel 110 adjacent to the specific focusing mark 120; measuring respective focus values of the plurality of focusing marks 120; obtaining an image through a focus value obtained by applying the warpage correction value to a focus value of an adjacent focusing mark 120 while sequentially moving between each channel 110; and counting the fine particles in the sample accommodated in each channel 110 through the obtained image.

As shown in FIG. 1, the sample chip 100 is provided with the plurality of channels 110 and may be configured with the multiple channels. In the present exemplary embodiment, the number of channels 110 is given to be 48, but is not limited thereto and may be embodied with modification to various numbers as needed.

The sample chip 100 may be configured by bonding an upper plate and a lower plate, and each channel 110 may be configured to form a space having a predetermined height between the upper plate and the lower plate. The height of each channel 110 is preferably provided to be 10 to 100 μm, so as to allow the fine particles to be observed in a stationary state without floating.

A sample inlet 112 through which a sample is introduced may be provided on one side of each channel 110, and a sample outlet 114 may be provided on the other side to discharge air and an excessive amount of sample from the inside of each channel 110.

Meanwhile, the sample chip 100 may be provided with a plurality of focusing marks 120 for obtaining focusing information for correcting a warpage height deviation of each channel 110. As shown in FIG. 2, the plurality of focusing marks 120 may be provided at positions adjacent to respective channels 110.

Each focusing mark 120 may have a circular shape when viewed as a whole by clustering a plurality of protrusion shapes as shown in the upper image of FIG. 3. Alternatively, as in the middle image of FIG. 3, each focusing mark 120 may be formed in a grid shape. In addition, each focusing mark 120 may be embodied with modification into various shapes.

In the present exemplary embodiment, each focusing mark 120 is positioned on the lower plate in the upper and lower plates. Each focusing mark 120 is used to check a degree of warpage of the sample chip 100. Focusing information for correcting the warpage height deviation of each channel 110 is profiled in advance through each focusing mark 120, and thus a topology related to height deviations of the sample chip 100 may be created. That is, the warpage information of the entire sample chip 100 is profiled in advance and stored.

Specifically, in the fine particle counting method using the multi-channel sample chip according to the exemplary embodiment of the present disclosure, first, a warpage correction value is obtained by calculating a difference between a focus value for a specific focusing mark 120 among a plurality of focusing marks 120 and a focus value of a channel 110 adjacent to the specific focusing mark 120.

As in an example in FIG. 3, the focus value of the specific focusing mark 120 is indicated to be 175 μm (photographed assuming both a case where the focusing mark is in a protrusion shape and a case where the focusing mark is in a grid shape), and the focus value of the channel 110 adjacent to the specific focusing mark 120 is indicated to be 240 μm, so a warpage correction value may be obtained as 65 μm, which is a difference between the two focus values. The reference positions of the specific focusing mark 120 and the channel 110 adjacent to the specific focusing mark 120 for determining such a warpage correction value may be designated in advance.

In the obtaining of the warpage correction value, the focus value for the specific focusing mark may be obtained through auto focus control, and the focus value of the channel adjacent to the specific focusing mark may be obtained through manual focus control or auto focus control, but the present disclosure is not limited thereto.

Next, a focus value of each of the plurality of focusing marks 120 is measured. In this case, measuring the focus value of each of the plurality of focusing marks 120 may be performed through the auto focus control.

Since the number of focusing marks 120 is provided to be less than the number of channels 110, even when focus value measurement for the focusing marks 120 is proceeded with auto focusing, the time required for the focus value measurement may be shortened compared to that of a case where all the channels 110 are proceeding with the auto focusing. As shown in FIG. 2, it may be confirmed that 42 focusing marks 120 are provided, which is less than the number of 48 channels 110. In addition, as shown in another exemplary embodiment of FIG. 9, it may also be confirmed that the number of 36 focusing marks is provided, which is less than the number of 48 channels 110.

After all, it is assumed that the focus value of the focusing mark 120 represents the focus value of the adjacent channel 110, and the number of the focusing marks 120, positions thereof, and the like may be embodied with modification as needed.

By the configuration as described above, it is possible to perform the obtaining of the images and the counting of the fine particles in a short period of time for the plurality of channels 110, so a high-throughput fine particle counting method may be implemented.

In the present exemplary embodiment, the warpage correction value is obtained, and then the focus value of each focusing mark 120 is measured, but it is also possible to proceed with changing the order of these steps. That is, these steps may be proceeded with an order of obtaining the warpage correction value after obtaining the focus value of each focusing mark 120.

Thereafter, an image is obtained for each channel 110 while sequentially moving between each of the channels 110. For example, a movement order for each channel 110 may be performed as shown in FIG. 10, but is not limited thereto, and may be embodied with modification as long as an order may enable efficient movement toward each adjacent channel 110.

In this case, in the focal distance adjustment in each channel 110, a focus value obtained by applying the warpage correction value is applied to the focus value, which is obtained in advance in the previous step, of the adjacent focusing mark 120, whereby an image may be quickly obtained.

In obtaining images of F01 and F08 channels 110 shown in FIG. 1, FIGS. 4 and 5 illustrate exemplary cases where respective images are captured with focus values obtained by applying the warpage correction value obtained in FIG. 3 to focus values of respective adjacent focusing marks 120. That is, respective images in the middle in FIGS. 4 and 5 are images of the case where the warpage correction value is applied, and respective images on the far right sides in FIGS. 4 and 5 are images obtained through auto focusing for the same respective channels 110.

In the case of FIG. 4, the focus value is 325 μm in the case when the warpage correction value is applied to the focus value of the focusing mark 120, and the focus value is 315 μm when captured through the auto focusing, whereby it may be confirmed that the two focus values have a very slight difference only and both images show similar sharpness to the extent that there is no difference in counting fine particles. Similarly, in FIG. 5 as well, it may be confirmed that a difference between the focus values is only about 10 μm and there is no difference in sharpness.

As such, the fine particle counting method according to the present disclosure may obtain an image having almost similar sharpness to that of the case where images of all channels 110 are obtained through auto focus control, so as to perform quick application of focal distance, whereby images may be quickly obtained.

Thereafter, the fine particles in the sample accommodated in each channel are counted through the obtained image. In addition, ultimately, a concentration of the fine particles may be obtained through calculations of the number of counted fine particles and the volume of the observed sample.

A volume for an image obtained in a case of applying a grid-shaped focusing mark 120 may be calculated in the following method.

First, as shown in FIG. 6, in the grid-shaped focusing mark 120, each grid pattern may be formed at intervals of 200 μm as an example. A predetermined area of such focusing marks 120 is obtained as an image, and a distance in pixel units of one grid is calculated from the obtained image, and then, by using this distance, the distance in μm per pixel is obtained.

In FIG. 6, since 108 pixels correspond to 200 μm, it may be confirmed that a distance per unit pixel is 1.85 μm/pixel. By applying this distance to image resolution, which is 1280×1024, the total area may be obtained.

That is, a width is 1280×1.85=2,368 μm, and a length is 1024×1.85=1,894 μm. In addition, when an area is obtained through this manner, the area is 2,368 μm×1,894 μm=4.484 mm$^2$, and when multiplying this area by a height of a design channel 110, the volume with respect to the image of the observed channel 110 may be obtained. Naturally, such area and volume calculations and fine particle counting are automatically performed on a system.

Due to the above-described warpage of the sample chip 100, even when an image has the same resolution, an area may vary because a distance per unit pixel changes as a focal distance changes. Meanwhile, when an area value is corrected through a grid-shaped focusing mark 120 and the corrected area value is applied to an adjacent channel 110 as described above, errors in volume calculation may be maximally reduced.

FIGS. 7 and 8 are views illustrating examples of obtaining up to corrected areas when respective focus values are obtained for grid-shaped focusing marks 120. For example, in FIG. 7, it may be confirmed that 1.8466 μm/pixel is obtained as a result of obtaining a distance per unit pixel through a focusing mark 120 adjacent to an A01 channel 110. As a result of applying this distance per unit pixel to the image resolution (i.e., 1280×1024), an area of 4.4695 mm$^2$ is obtained. The calculations of a volume and concentration are performed by applying this area value to the A01 channel 110 and the like adjacent to the corresponding focusing mark 120.

In addition, FIG. 8 shows an obtained area value identically corrected through the focusing mark 120 adjacent to the F01 channel 110, and it may be confirmed that a distance per unit pixel is 1.8472 μm/pixel and an area value is 4.4722 mm$^2$. Similarly, the calculations of a volume and concentration are performed by applying this area value to the F01 channel 110 and the like adjacent to the corresponding focusing mark 120.

As described above, in the case of using a grid-shaped focusing mark 120, there are strong points of enabling fast capturing of an image to which a focus value is applied and correcting an area error as well.

Consequently, through the above-described counting method, the concentration calculation is enabled for the multi-channel sample chip 100 through fast image obtainment, fine particle counting, and accurate volume calculation. Hereinafter, a fine particle counting apparatus implementing the above-described fine particle counting method will be described in detail.

Figure 11:
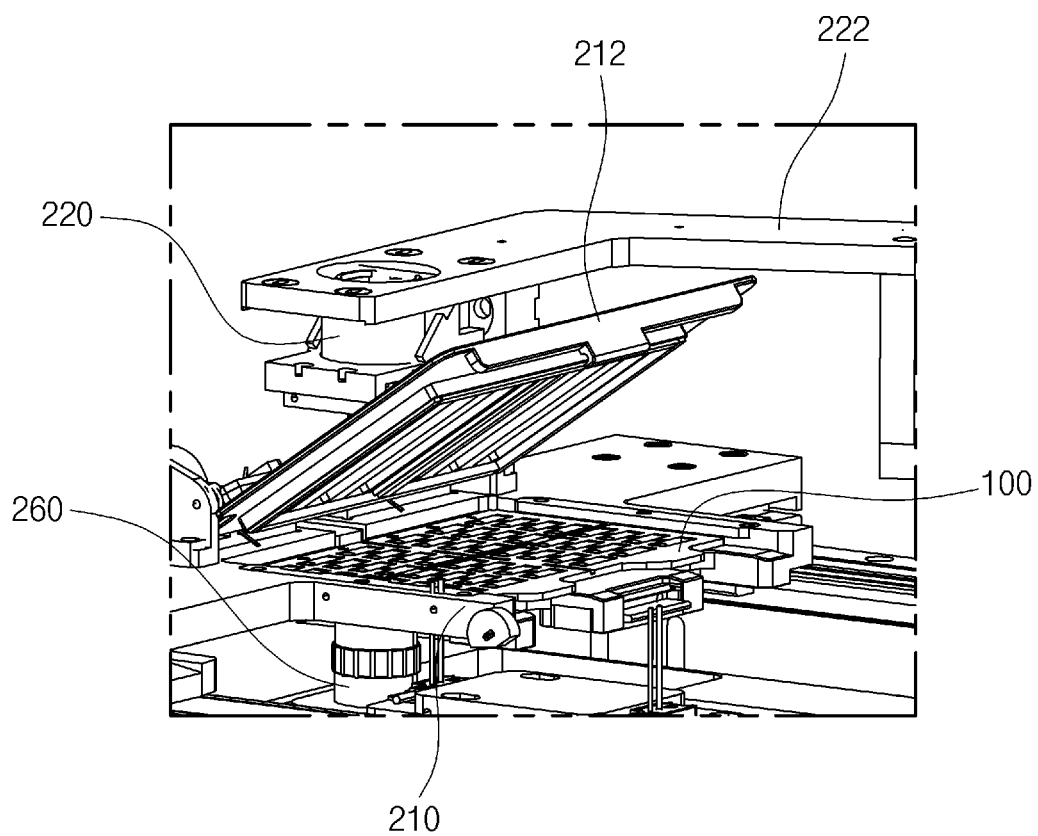
FIG. 11 is a partially enlarged perspective view of the fine particle counting apparatus using the multi-channel sample chip as viewed from one side according to the exemplary embodiment of the present disclosure.
Figure 12:
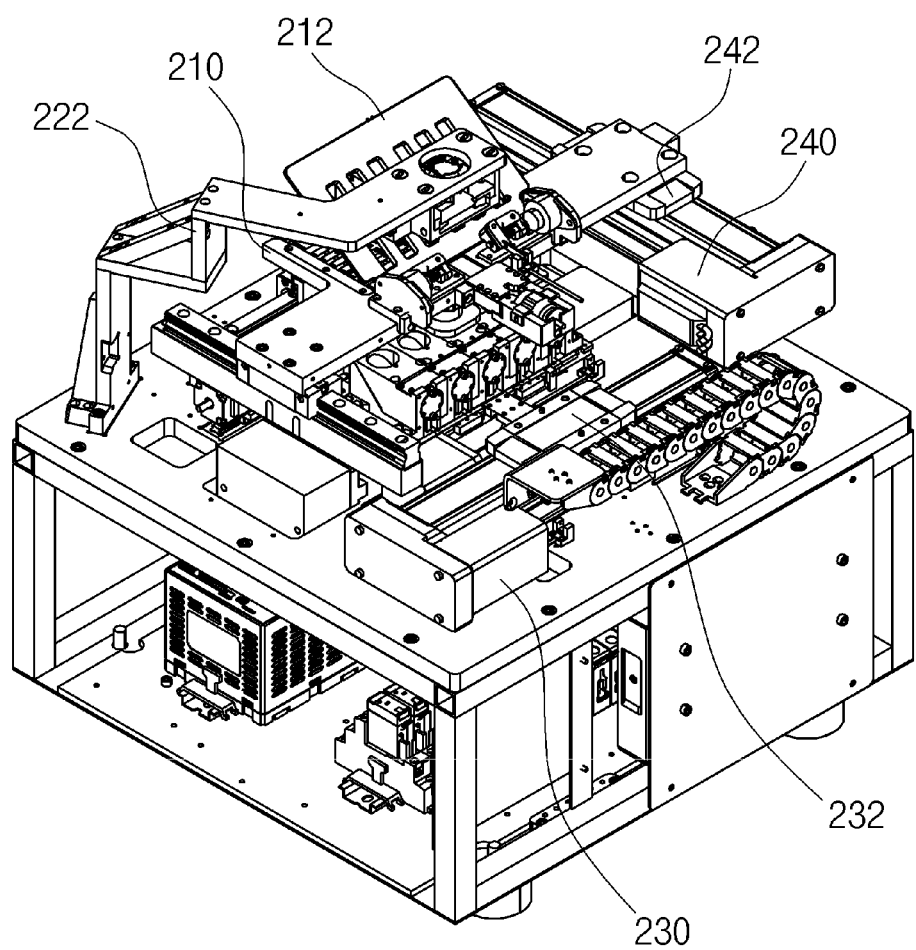
FIG. 12 is a perspective view of the fine particle counting apparatus using the multi-channel sample chip as viewed from one side according to the exemplary embodiment of the present disclosure.
Figure 13:
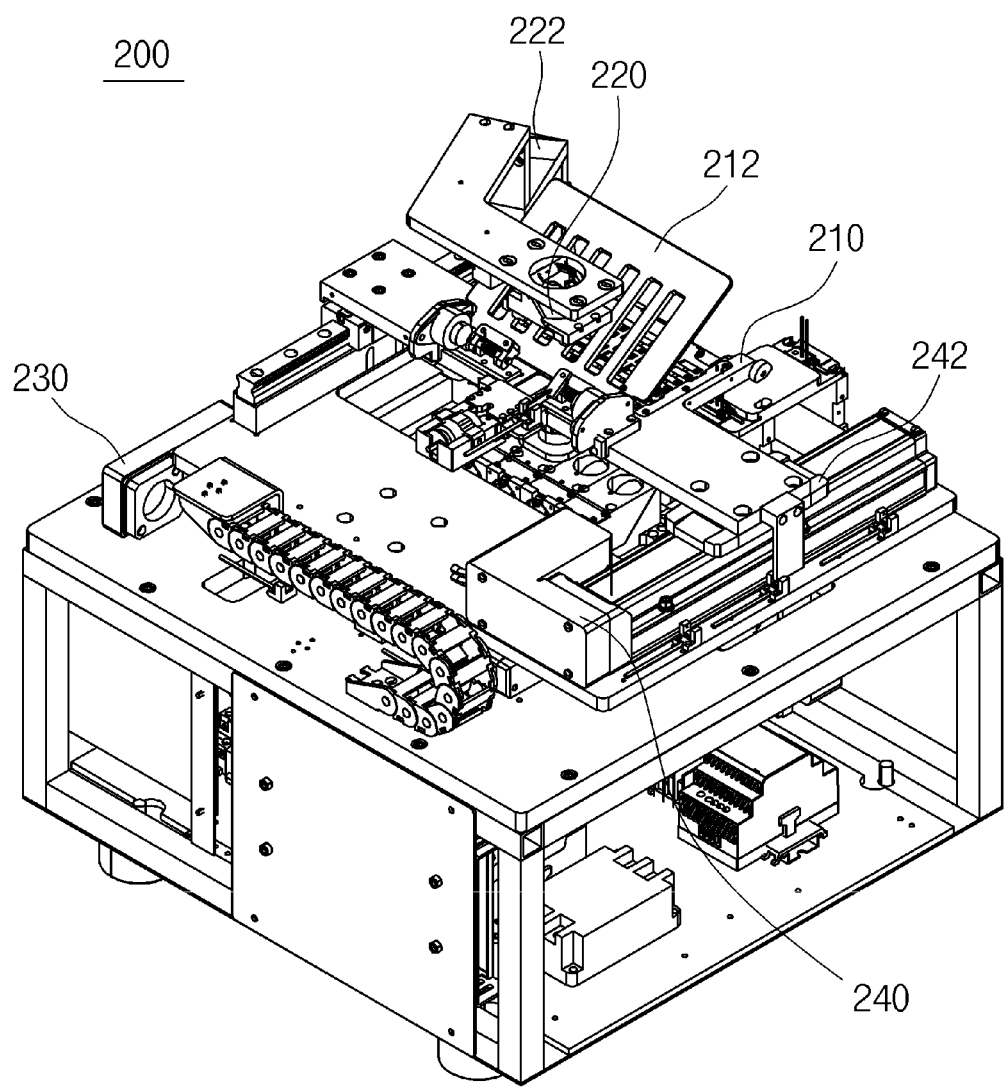
FIG. 13 is a perspective view of the fine particle counting apparatus using the multi-channel sample chip as viewed from another side according to the exemplary embodiment of the present disclosure.
Figure 14:
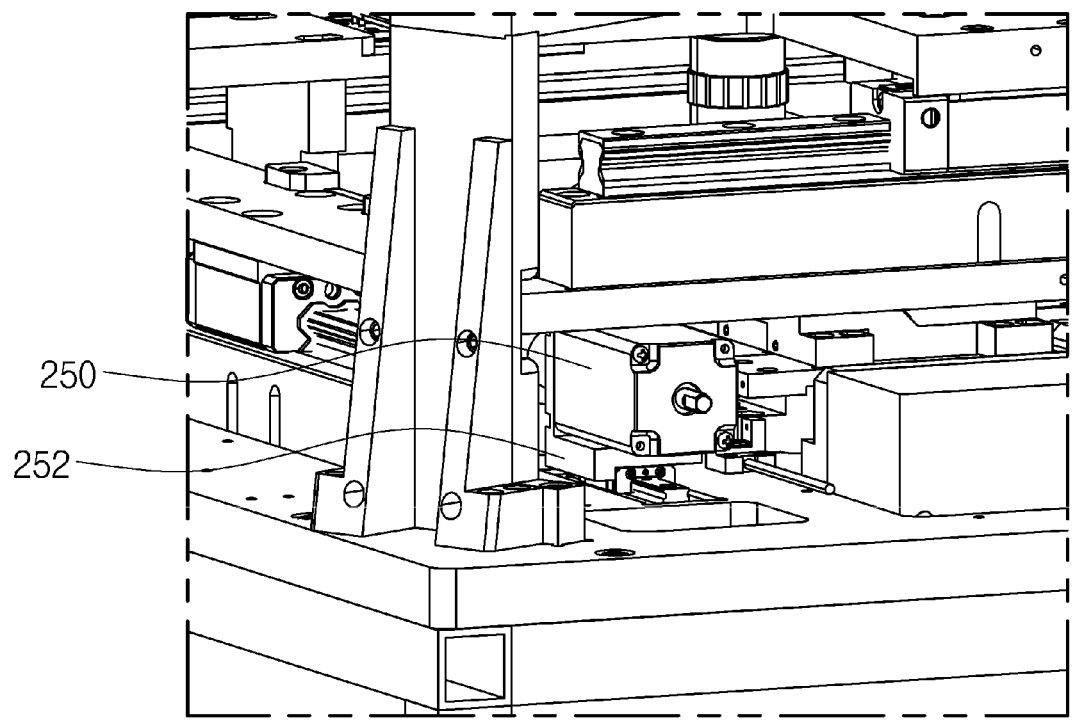
FIG. 14 is a partially enlarged perspective view illustrating a Z-axis moving unit and a Z-axis driving unit of the fine particle counting apparatus using the multi-channel sample chip according to the exemplary embodiment of the present disclosure.
Figure 15:
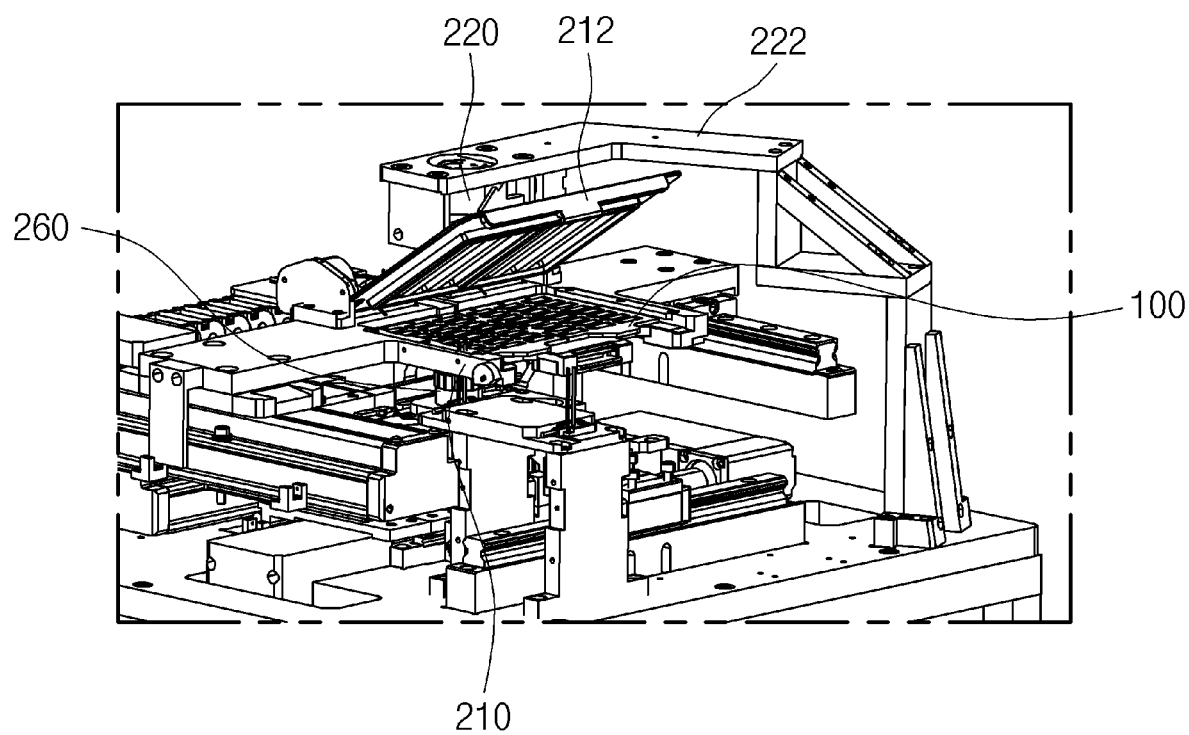
FIG. 15 is a partially enlarged perspective view illustrating a configuration of an upper part of the fine particle counting apparatus using the multi-channel sample chip according to the exemplary embodiment of the present disclosure.
Figure 16:
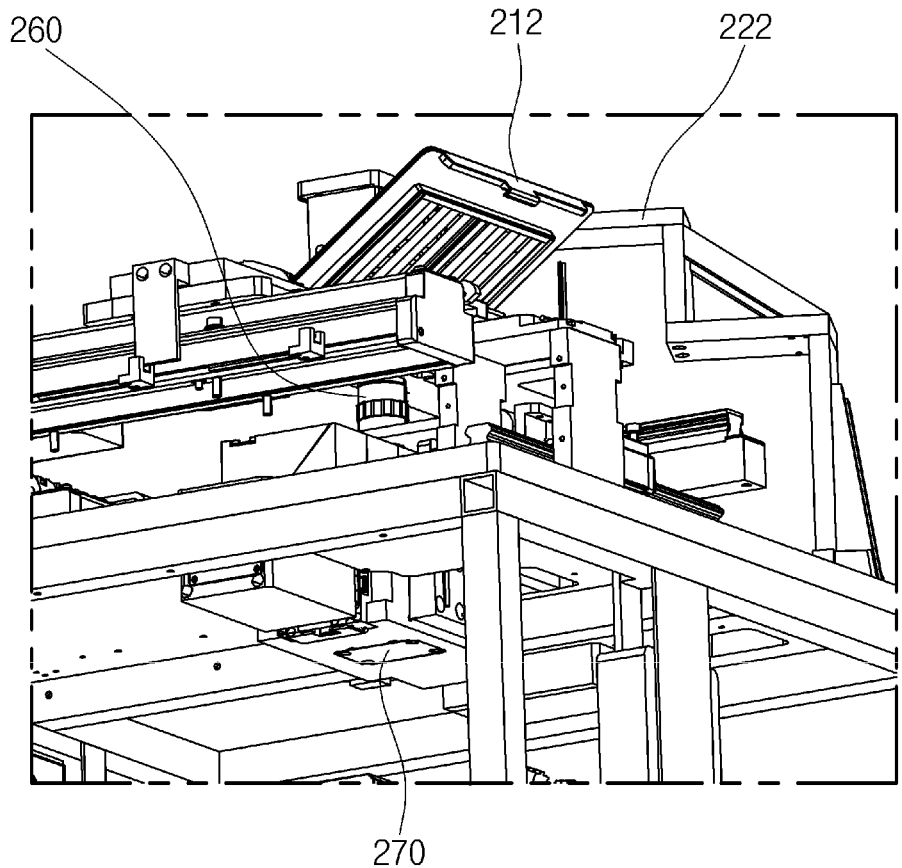
FIG. 16 is a partially enlarged perspective view illustrating an optical system of the fine particle counting apparatus using the multi-channel sample chip according to the exemplary embodiment of the present disclosure.
Figure 17:
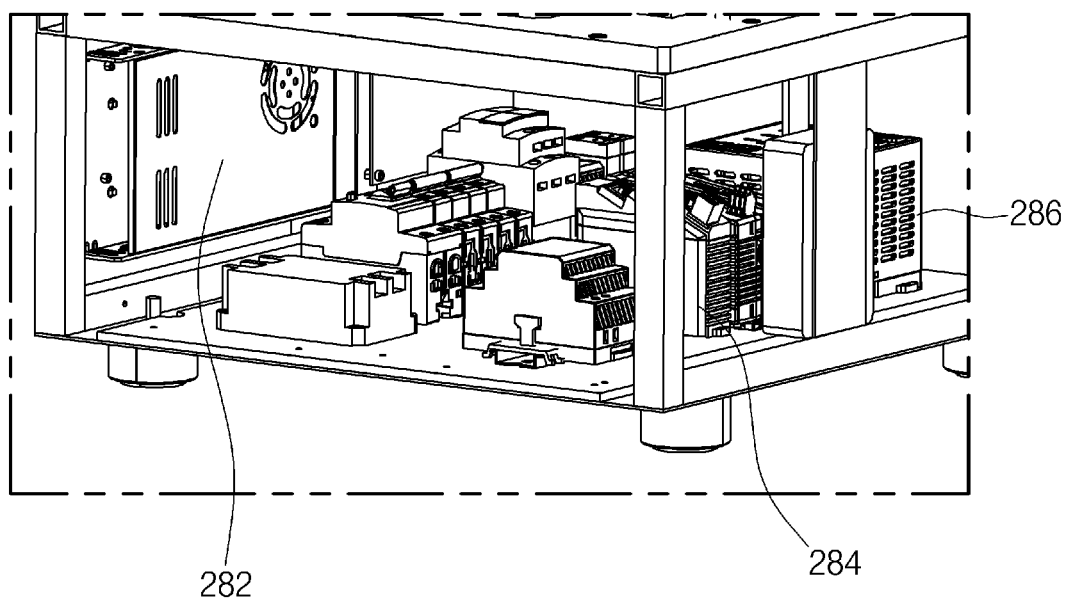
FIG. 17 is a partially enlarged perspective view illustrating a configuration of a lower part of the fine particle counting apparatus using the multi-channel sample chip according to the exemplary embodiment of the present disclosure.

FIG. 11 is a partially enlarged perspective view of the fine particle counting apparatus using the multi-channel sample chip as viewed from one side according to the exemplary embodiment of the present disclosure. FIG. 12 is a perspective view of the fine particle counting apparatus using the multi-channel sample chip as viewed from one side according to the exemplary embodiment of the present disclosure. FIG. 13 is a perspective view of the fine particle counting apparatus using the multi-channel sample chip as viewed from another side according to the exemplary embodiment of the present disclosure. FIG. 14 is a partially enlarged perspective view illustrating a Z-axis moving unit and a Z-axis driving unit of the fine particle counting apparatus using the multi-channel sample chip according to the exemplary embodiment of the present disclosure. FIG. 15 is a partially enlarged perspective view illustrating a configuration of an upper part of the fine particle counting apparatus using the multi-channel sample chip according to the exemplary embodiment of the present disclosure. FIG. 16 is a partially enlarged perspective view illustrating an optical system of the fine particle counting apparatus using the multi-channel sample chip according to the exemplary embodiment of the present disclosure. FIG. 17 is a partially enlarged perspective view illustrating a configuration of a lower part of the fine particle counting apparatus using the multi-channel sample chip according to the exemplary embodiment of the present disclosure.

Referring to FIGS. 1 to 17, a fine particle counting apparatus 200 using a multi-channel sample chip according to the exemplary embodiment of the present disclosure may largely be configured to include: a sample chip 100 provided with a plurality of channels 110 each accommodating a sample containing fine particles; a stage 210 provided with the sample chip 100 seated thereon; a light source unit 220 configured to emit light to each channel on the sample chip 100 seated on the stage; an objective lens unit 260 configured to magnify an image of the sample accommodated in each channel through which the light passes; an image sensor unit 270 configured to obtain the image magnified by the objective lens unit 260; a fine particle counting unit configured to count the fine particles in the sample accommodated in each channel through the obtained image; and a stage movement unit configured to move the stage, The multi-channel sample chip 100 having the above-described structure is applied to the fine particle counting apparatus 200. As described above, correction of a warpage height deviation of each channel 110 is the same as that in the above description in that the correction is performed by applying, to a focus value of each focusing mark 120, a warpage correction value obtained by calculating a difference between a focus value for a specific focusing mark 120 among a plurality of focusing marks 120 and a focus value of a channel 110 adjacent to the specific focusing mark 120.

The sample chip 100 may be seated on the stage 210 implemented to correspond to the shape of the sample chip 100. The stage 210 may include a stage cover 212 capable of covering the sample chip 100 after the sample chip 100 is seated on the stage 210. The stage cover 212 may be configured to have hollows formed therein so that each channel 110 and each focusing mark 120 may be seen therethrough.

The light source unit 220 may be provided above the stage 210. The light source unit 220 is positioned above the stage 210 in a state supported by a light source support unit 222 and serves to emit light to each channel on the sample chip 100 seated on the stage 210.

Various light sources such as an LED, laser, halogen lamp, xenon lamp, and mercury lamp may be selected and applied to the light source unit 220 according to the characteristics of particles to be counted. For example, in a case of counting red blood cells, a lamp or LED emitting ultraviolet-visible light is preferably used as the light source unit 220. In a case of counting leukocytes or somatic cells containing cell nuclei, a laser is preferably used as the light source unit 220.

Although not shown, an incident light control lens may be further included on the front of the light source unit 220 as well to adjust the amount and focal distance of light emitted from the light source unit 220 and to emit the light onto the sample chip 100.

Meanwhile, an objective lens unit 260 may be provided below the stage 210. The objective lens unit 260 may serve to magnify an image of a sample accommodated in each channel through which light passes. The objective lens unit 260 may select and use a lens having an arbitrary magnification as needed. In order to determine the overall distribution of particles in each channel 110 on the sample chip 100, observation with low magnification is preferable. In the present exemplary embodiment, a 4× objective lens is applied.

An image sensor unit 270 is provided below the objective lens unit 260. An image magnified by the objective lens unit 260 may be obtained as an image through the image sensor unit 270. Image sensors in various types such as charge coupled device (CCD), complementary metal oxide semiconductor (CMOS), or the like may be applied to the image sensor unit 270.

The light source unit 220, the objective lens unit 260, and the image sensor unit 270 are arranged in a row on a Z-axis to form an optical system.

A fine particle counting unit (not shown) counts the fine particles in the sample accommodated in each channel 110 through the image obtained by the image sensor unit 270. The fine particle counting unit may be implemented as software, which is installed as a program or an application in a PC, a server, or a mobile terminal connected to the fine particle counting apparatus 200 wirelessly or wired, or may also be embedded in an on-chip method in a microcomputer in the fine particle counting apparatus 200.

Meanwhile, the stage movement unit for moving the stage 210 may be provided. The stage movement unit is implemented to enable moving the stage 210 precisely in three-axis directions.

First, the stage movement unit includes an X-axis moving unit 232 and an X-axis driving unit 230. The X-axis drive unit 230 is provided with a motor and an encoder to provide a driving force for the X-axis moving unit 232 connected to the stage 210 to precisely control and move the stage 210 in an X-axis direction.

Similarly, the stage movement unit includes a Y-axis moving unit 242 and a Y-axis driving unit 240. The Y-axis drive unit 240 is provided with a motor and an encoder to provide a driving force for the Y-axis moving unit 242 connected to the stage 210 to precisely control and move the stage 210 in a Y-axis direction.

The stage 210 is movable in an XY plane through the X-axis moving unit 232 and the Y-axis moving unit 242, and accordingly, each channel 110 and each focusing mark 120 on the sample chip 100 are movable to correspond to the above-described optical system. In addition, through this manner, an operation is possible to sequentially move between each channel 110 or sequentially move to each focusing mark 120.

In addition, the stage movement unit includes a Z-axis moving unit 252 and a Z-axis driving unit 250. The Z-axis drive unit 250 is also provided with a motor and an encoder to provide a driving force for the Z-axis moving unit 252 connected to the stage 210 to precisely control and move the stage 210 in a Z-axis direction. A focal distance is adjustable by the Z-axis moving unit 252 that moves the stage in the Z-axis direction.

A power supply unit 282, a communication unit 284, and a motor controller 286 may be provided on a lower part of the fine particle counting apparatus 200. The power supply unit 282 serves to supply power to the entire apparatus, the communication unit 284 serves to transmit and receive data or control commands to and from an external PC, server, or mobile terminal through a wireless or wired method, and the motor controller 286 serves to control the motors installed in the stage movement unit.

Figure 18:
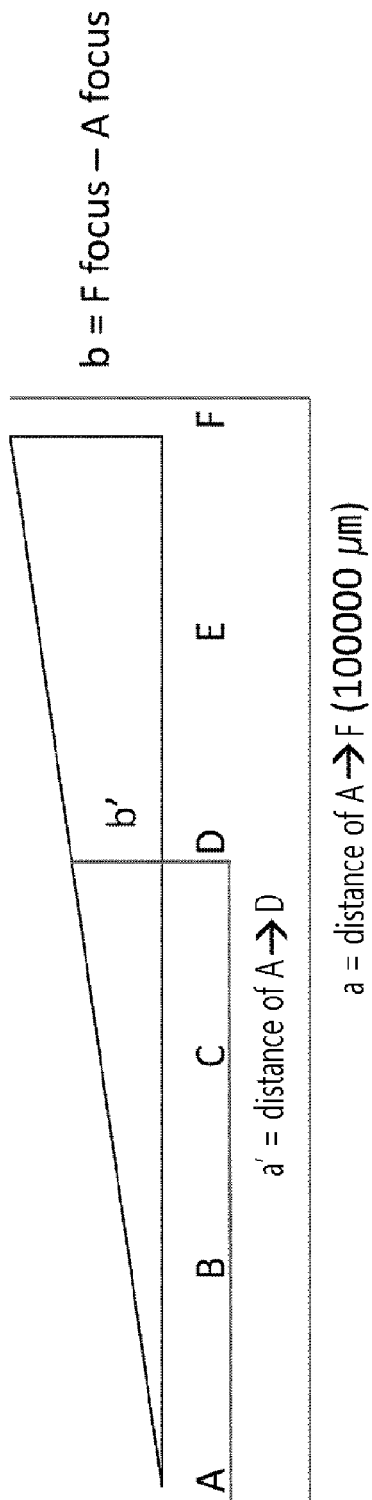
FIG. 18 is a conceptual view illustrating a principle of topological mapping by using coordinate values and focus values of some focusing marks in the sample chip of the fine particle counting apparatus using the multi-channel sample chip according to the exemplary embodiment of the present disclosure.
Figure 20:
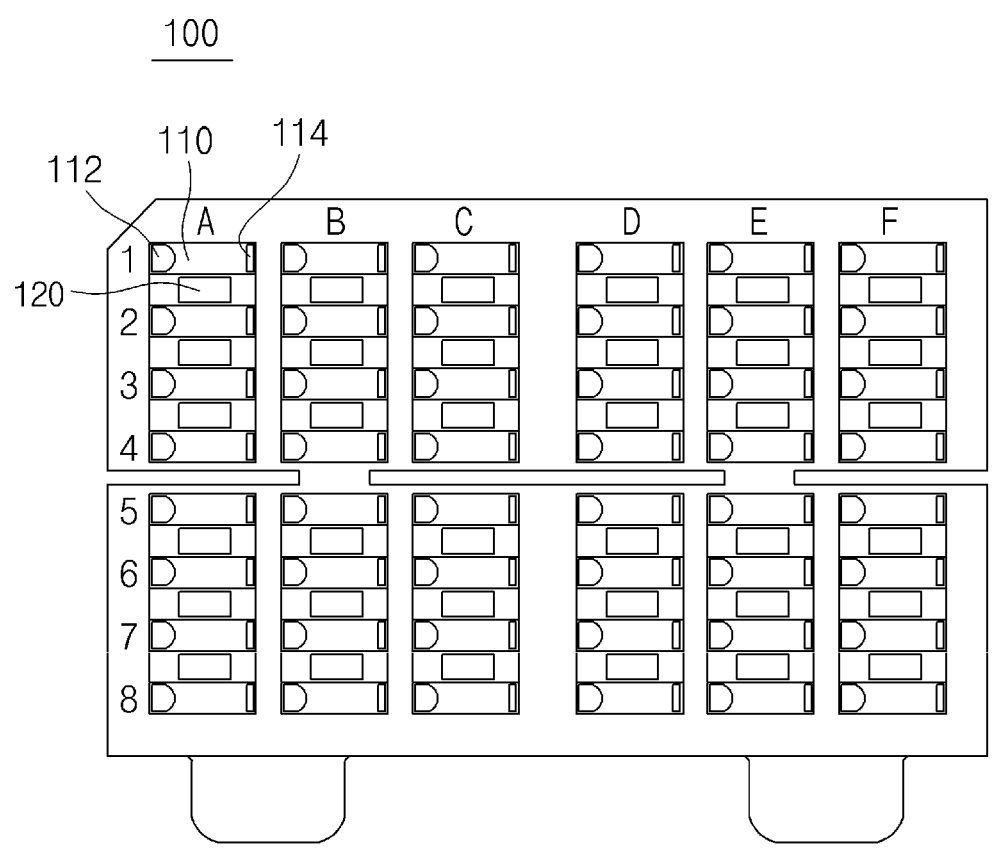
FIG. 20 is a plan view illustrating a sample chip of a fine particle counting apparatus using a multi-channel sample chip according to another exemplary embodiment of the present disclosure.
Figure 21:
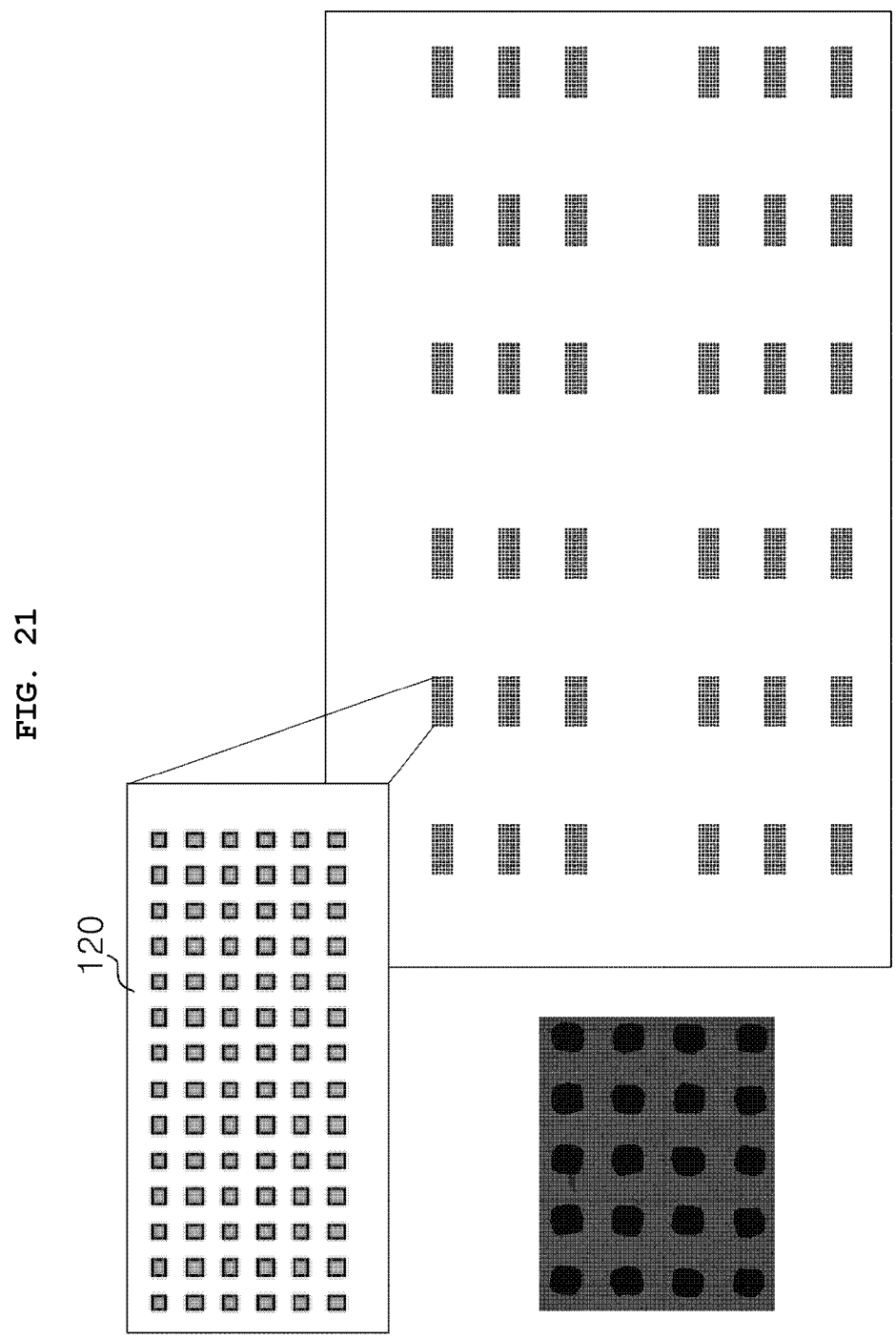
FIG. 21 is a layout view illustrating focusing marks applied to a lower plate of the sample chip of FIG. 20 and an actual captured image thereof.
Figure 22:
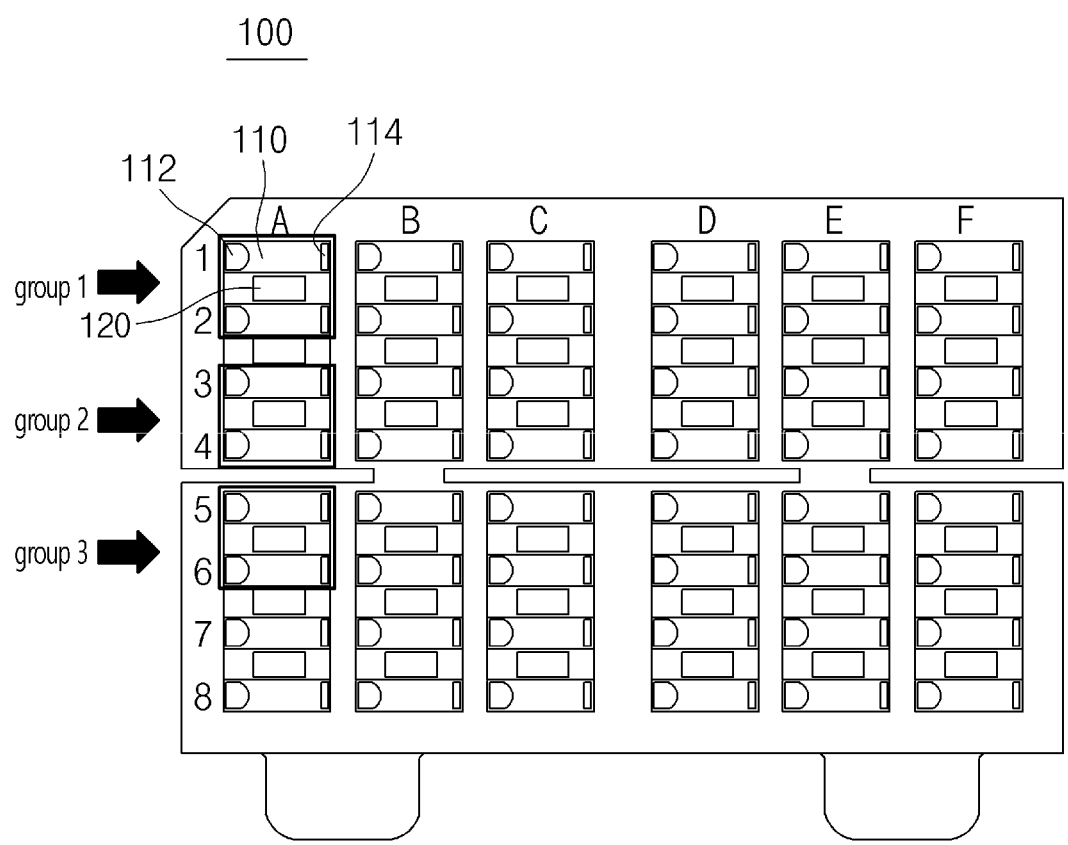
FIG. 22 is a plan view illustrating a case of dividing, into groups, the sample chip of the fine particle counting apparatus using the multi-channel sample chip according to the exemplary embodiment of the present disclosure.

FIG. 18 is a conceptual view illustrating a principle of topological mapping by using coordinate values and focus values of some focusing marks in the sample chip of the fine particle counting apparatus using the multi-channel sample chip according to the exemplary embodiment of the present disclosure. FIG. 19 is a table illustrating an example of obtaining a focus value of a focusing mark corresponding to a position of each channel through the topology mapping in the sample chip of the fine particle counting apparatus using the multi-channel sample chip according to the exemplary embodiment of the present disclosure. FIG. 20 is a plan view illustrating a sample chip of a fine particle counting apparatus using a multi-channel sample chip according to another exemplary embodiment of the present disclosure. FIG. 21 is a layout view illustrating focusing marks applied to a lower plate of the sample chip of FIG. 20 and an actual captured image thereof. FIG. 22 is a plan view illustrating a case of dividing, into groups, the sample chip of the fine particle counting apparatus using the multi-channel sample chip according to the exemplary embodiment of the present disclosure.

Referring to FIGS. 18 to 22, as for the focus values of the plurality of focusing marks 120, the embodiment of the present disclosure may be configured such that focus values of some focusing marks 120 among all the focusing marks 120 are measured, and by using this, topology mapping is performed on a degree of warpage of the entire sample chip 100 to obtain focus values of the remaining focusing marks 120.

For example, as shown in FIG. 18, in a case where respective focus values of A and F are measured and known, a focus value at an arbitrary point D between A and F may be calculated and obtained. In addition, respective focus values at B, C, and E may be obtained in the same way, and through such a method, topology mapping is performed on the degree of the warpage of the entire sample chip 100 by using the coordinate values of some focusing marks 120, so that the focus values of the remaining focusing marks 120 may be obtained.

As a specific example, a topology map obtained by calculating the focus values of the focusing marks 120 is shown as a table in FIG. 19. First, focus values of focusing marks (corresponding to A01, A08, F01, and F08), which are serving as standard are obtained, and focus values of the remaining focusing marks 120 are obtained.

Example 1: calculating B01 to E01 by using a height difference between A01 and F01.

$$B01 = A01 + ((F01 - A01)/F(100000) \times B(20000))$$
$$= 1000 + ((2000 - 1000)/100000 \times 20000)$$
$$= 1200$$

Example 2: calculating A02 to A07 by using a height difference between A01 and A08.

$$A02 = A01 + ((A08 - A01)/08(126000) \times 02(18000))$$
$$= 1000 + ((2000 - 1000)/126000 \times 18000)$$
$$= 1143$$

By using the coordinates and focus values of some focusing marks 120 in the method as described above, the focus values of the remaining focusing marks 120 may be obtained through the topology mapping.

In relation to the above-described topological mapping, only a linear warpage aspect is shown in FIGS. 18 and 19, but the present disclosure is not limited thereto. For example, since various types of topology mapping are applicable by appropriately adjusting the number of focusing marks and the positions to measure the focusing marks, whereby various types of warpage aspects may be predicted and applied.

In addition, through this manner, even when the entire focusing mark 120 is not measured, an image of each channel may be captured more quickly and accurately by applying a topology mapping function.

Meanwhile, as described above, a pattern of each focusing mark 120 may be embodied with modification in various forms.

As shown in FIGS. 20 and 21, a grid-shaped focusing mark 120 may be embossed. In a case where a grid pattern presented in the previous exemplary embodiment is formed by engraving, the grid pattern may be recognized as opaque, causing a difficulty in measuring a focus value. In order to compensate for this issue, an embossed grid pattern may be applicable. More preferably, as shown in the actual photographed image of FIG. 21, visibility may be further improved by forming a grid pattern in an embossed black square shape.

Meanwhile, as shown in FIG. 22, the steps of obtaining a warpage correction value, measuring the respective focus values of the plurality of focusing marks 120, and obtaining the image may configured to be repeatedly performed for each group formed by dividing the sample chip 100.

When the above method is described in order on the basis of FIG. 22, the method is as follows.

(1) A focus value of an A01 channel 110 is measured through manual focus control.

(2) A focus value of a focusing mark 120 of group 1 is measured through auto focus control.

(3) A warpage correction value is obtained through the values of (1) and (2).

(4) Respective images of A01 and A02 are sequentially obtained through focus values corrected by applying the warpage correction value of group 1.

(5) A focus value of each focusing mark of group 2 is obtained, and respective images of A03 and A04 are sequentially obtained by applying the warpage correction value of (3).

(6) A focus value of each focusing mark of group 3 is obtained, and respective images of A05 and A06 are sequentially obtained by applying the warpage correction value of (3).

In this case, as in (4), (5), and (6), the groups applying the same warpage correction value may be designated in advance. In addition, in a case where another sample is measured in the sample chip 100, a warpage correction value is newly measured in a group to which a measurement position belongs, and an image is obtained by adjusting a focus with a value corrected through this warpage correction value. In this case, groups applying the same warpage correction value may be designated in advance.

According to the fine particle counting method using the multi-channel sample chip and the fine particle counting apparatus implementing the same according to the exemplary embodiments of the present disclosure described so far, a plurality of samples is observable in a short period of time and even when warpage occurs during a manufacturing process as a sample chip becomes larger, the warpage is corrected so as to count fine particles accurately.

In addition, the present disclosure may solve the problems that a focal distance of each channel is not constant due to warpage occurring in a chip having a plurality of channels, and thus it takes a lot of time to obtain an image by obtaining a focus value for each channel.

In addition, the present disclosure may prevent a problem that since an amount of sample injected into each channel is small, a sample dries out when an image is not quickly obtained and used for counting, thereby causing the occurrence of measurement error.

Although the above has been described with reference to the exemplary embodiment of the present disclosure, those skilled in the art may variously modify, add, and substitute the present disclosure within the scope without departing from the spirit and scope of the present disclosure specified in the claims described below. Therefore, when the modified implementation fundamentally includes the components of the claims of the present disclosure, all of them should be considered to be included in the technical scope of the present disclosure.

What is claimed is:

1. A fine particle counting method using a multi-channel sample chip, the method counting fine particles in a sample accommodated in each channel on the sample chip having a plurality of channels and a plurality of focusing marks, the method comprising:
   obtaining a warpage correction value by calculating a difference between a focus value of a specific focusing mark among the plurality of focusing marks and a focus value of a channel adjacent to the specific focusing mark;
   measuring respective focus values of the plurality of focusing marks;
   obtaining an image through a focus value obtained by applying the warpage correction value to a focus value of an adjacent focusing mark while sequentially moving between each channel; and counting the fine particles in the sample accommodated in each channel through the obtained image, wherein the number of focusing marks is less than the number of channels, wherein, in the obtaining of the warpage correction value, the focus value for the specific focusing mark is obtained through auto focus control, and the focus value of the channel adjacent to the specific focusing mark is obtained through manual focus control or the auto focus control, wherein, in the measuring of the respective focus values of the plurality of focusing marks, the focus values are obtained through auto focus control.

2. The method of claim 1, wherein each focusing mark is formed by clustering a plurality of protrusion shapes.

3. The method of claim 1, wherein each focusing mark is formed in a grid shape.

4. The method of claim 3, wherein a distance per unit pixel is obtained by using a grid pattern of each focusing mark in the grid shape, and an area is obtained by applying this distance per unit pixel to image resolution and applied as the area of the image of the adjacent channel.

5. The method of claim 3, wherein each focusing mark in the grid shape is formed by embossing.

6. The method of claim 1, wherein, in the respective focus values of the plurality of focusing marks, focus values of some focusing marks among all the focusing marks are measured, and by using this, topology mapping is performed on a degree of warpage of an entire sample chip to obtain focus values of remaining focusing marks.

7. The method of claim 1, wherein steps of obtaining the warpage correction value, measuring the respective focus values for the plurality of focusing marks, and obtaining the image are repeatedly performed for each group formed by dividing the sample chip.

8. The method of claim 7, wherein the groups applying a same warpage correction value are designated in advance.

9. A fine particle counting method using a multi-channel sample chip, the method counting fine particles in a sample accommodated in each channel on a sample chip having a plurality of channels and a plurality of focusing marks, the method comprising:

measuring respective focus values of the plurality of focusing marks;

obtaining a warpage correction value by calculating a difference between a focus value of a specific focusing mark among the plurality of focusing marks and a focus value of a channel adjacent to the specific focusing mark;

obtaining an image through a focus value obtained by applying the warpage correction value to a focus value of an adjacent focusing mark while sequentially moving between each channel; and counting the fine particles in the sample accommodated in each channel through the obtained image, wherein the number of focusing marks is less than the number of channels, wherein, in the obtaining of the warpage correction value, the focus value for the specific focusing mark is obtained through auto focus control, and the focus value of the channel adjacent to the specific focusing mark is obtained through manual focus control or the auto focus control, wherein, in the measuring of the respective focus values of the plurality of focusing marks, the focus values are obtained through auto focus control.

10. The method of claim 9, wherein, in the respective focus values of the plurality of focusing marks, focus values of some focusing marks among all the focusing marks are measured, and by using this, topology mapping is performed on a degree of warpage of an entire sample chip to obtain focus values of remaining focusing marks.

11. The method of claim 9, wherein steps of obtaining the warpage correction value, measuring the respective focus values for the plurality of focusing marks, and obtaining the image are repeatedly performed for each group formed by dividing the sample chip.

12. The method of claim 11, wherein the groups applying a same warpage correction value are designated in advance.

* * * * *